United States Patent [19]

Sherwood, Jr. et al.

[11] Patent Number: 4,638,313
[45] Date of Patent: Jan. 20, 1987

[54] ADDRESSING FOR A MULTIPOINT COMMUNICATION SYSTEM FOR PATIENT MONITORING

[75] Inventors: Glen R. Sherwood, Jr., Hillsboro; James B. Moon; Gordon A. Moyle, both of Portland, all of Oreg.

[73] Assignee: SpaceLabs, Inc., Chatsworth, Calif.

[21] Appl. No.: 669,289

[22] Filed: Nov. 8, 1984

[51] Int. Cl.$^4$ .................................... H04Q 1/00
[52] U.S. Cl. .................... 340/825.52; 340/825.06; 340/825.08; 340/825.53
[58] Field of Search ................. 370/86, 90, 96, 85, 370/93, 92, 79, 89; 340/825.05, 825.07, 825.08, 825.5, 825.51, 825.06, 825.52, 825.53

[56] References Cited

U.S. PATENT DOCUMENTS

| | | | |
|---|---|---|---|
| 4,149,144 | 4/1979 | Diefenderfer | 370/96 |
| 4,506,360 | 3/1985 | Kryskow, Jr. et al. | 370/86 X |
| 4,510,596 | 4/1985 | Hartmann et al. | 370/79 X |
| 4,530,045 | 7/1985 | Petroff | 340/825.05 X |

OTHER PUBLICATIONS

IBM publication GA27-3093-2, File No. Genl-90, 1979.

Primary Examiner—Ulysses Weldon
Attorney, Agent, or Firm—Lawrence S. Levinson; Robert E. Lee, Jr.

[57] ABSTRACT

A method for dynamically assigning addresses to new modules as they are coupled to a communication system with a synchronous data link control (SDLC) bus is described. These modules communicate with a display unit via the SDLC bus. The SDLC bus is controlled by a primary station in the display unit, with all modules acting as secondary stations. The primary station periodically broadcasts a time-tag to all modules at a thirty-two hertz rate. At power up, each module obtains a number, module 16, derived from the lower four bits of its unique twenty-four bit serial number. The module uses this number as a count of the number of time-tags which must occur before the module responds to the primary with an address request. If there are no collisions with other modules, the primary sends the module a packet which assigns the module the next available address. In the event of a collision (i.e., two or more modules request an address at the same time), the primary SDLC controller detects a CRC error and ignores the SDLC frame. The modules will each time-out and obtain a new number, modulo 16, derived from the next significant four bits of the module serial number. This process continues until the module obtains an address.

6 Claims, 4 Drawing Figures

ADDRESSING FOR A MULTIPOINT COMMUNICATION SYSTEM FOR PATIENT MONITORING

BACKGROUND OF THE INVENTION

The present invention relates to an improved multipoint communication system for patient monitoring; more particularly, to an improved system for address assignment of various plug in patient monitoring modules in such a multipoint communication system.

Today's medical patient monitoring systems require: flexibility in the number of physiological parameters to be monitored; addition and removal of monitoring means for such parameters without causing interruption of other monitoring functions; flexibility with respect to the location of the data acquisition hardware, and cost. In addition, it is essential that future capabilities be easily integrated into the framework of the monitor system.

One approach to realizing this flexibility is through a modularized patient monitoring system. In such a system monitors are reconfigurable to monitor different combinations of patient parameters through the use of plug in modules. Each plug-in module acquires the data to be monitored such as pressure, temperature, ECG, etc., digitizes it, processes it and prepares it for transmission to a master processor within the monitor or monitoring system for display etc. In addition, the overall monitoring system may include many monitors for a number of patients, each monitor reconfigurable with a plurality of plug-in modules. The monitors and plug-in modules within an overall critical care or intensive care unit of a hospital may be coupled together for monitoring and control by a central station by a communication system such as a multipoint communication system.

In such a system such as that described above, where modules may be moved from one location within one monitor to a module location within a different monitor increased flexibility in the manner of assigning addresses to such modules and monitors for connection to the communication system are desirable.

SUMMARY OF THE INVENTION

A method and apparatus for synchronizing new secondary stations to a multipoint communication system coupled together by a serial data link control bus is provided. The present invention provides for dynamically assigning bus addresses to new secondary stations as they couple to the system. The primary station of the system periodically broadcasts time-tags to all secondary stations simultaneously at the beginning of each poll interval. Each secondary station upon coupling to the system automatically generates a time-tag count number and waits that number of poll intervals before requesting an address from said primary during an address initialization phase at the beginning of the chosen poll interval.

Each secondary station is assigned a unique multibit serial number which forms the basis for determining a count number. If two or more secondary stations request addresses during the same poll interval, the stations automatically generate new count numbers and request addresses at a later time in accordance with the new count number. In the preferred embodiment, a different subset of bits from the multibit number is used to determine each count number.

DETAILED DESCRIPTION OF THE DRAWINGS

Figure 1:
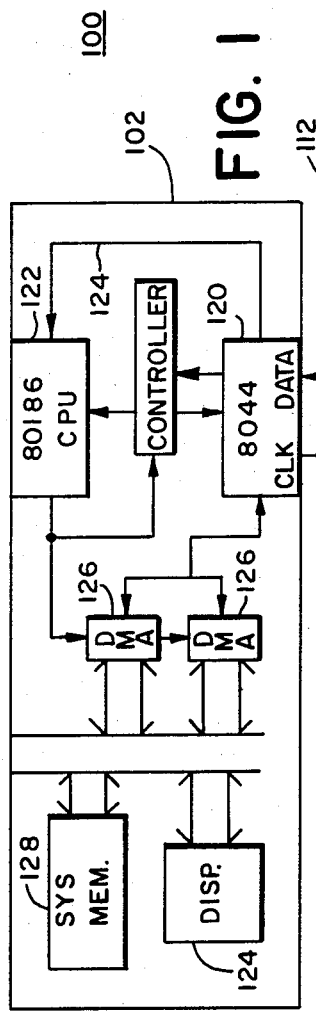
FIG. 1 is an overall block diagram of a preferred embodiment patient monitoring communication system.

Referring to FIG. 1, a block diagram of a preferred embodiment patient monitoring communications system designated generally 100 for the present invention is shown. It comprises a primary controlling station 102 and one or more secondary remote stations such as stations 104, 106 and 108. The primary and secondary stations are coupled together over serial data link 110 with a clock provided by the primary station over line 112.

In the preferred embodiment the primary station 102 comprises an 8044 Remote Universal Peripheral Interface (RUPI) 120 and an 80186 main processor 122 both made by Intel. The primary station 102 controls communications on the network and controls display of the data on the display 124.

In one example of a patient monitor utilizing the communication arrangement of FIG. 1, each of the secondary stations 104, 106 and 108 comprises an 8044 RUPI and a patient interface. The secondary stations represent individual modules for monitoring particular patient parameters. For example, 104 may be an ECG module, while 106 is temperature module and 108 is a pressure module. In the ECG module, e.g., analog data is acquired by electrodes coupled to the patient. The data is digitized and processed by an ECG algorithm and prepared as a message for transmission over the data link 110 to the primary station where it will be displayed. The secondary station may or may not require a dedicated processor for digitizing and processing the signal.

In the system of FIG. 1, all of the communications are initiated by the primary station, while a secondary station receives only that data which is addressed to it, and transmits only when polled by the primary. In the preferred embodiment, the Synchronous Data Link Control (SDLC) protocol is used with the arrangement of FIG. 1.

Figure 2:
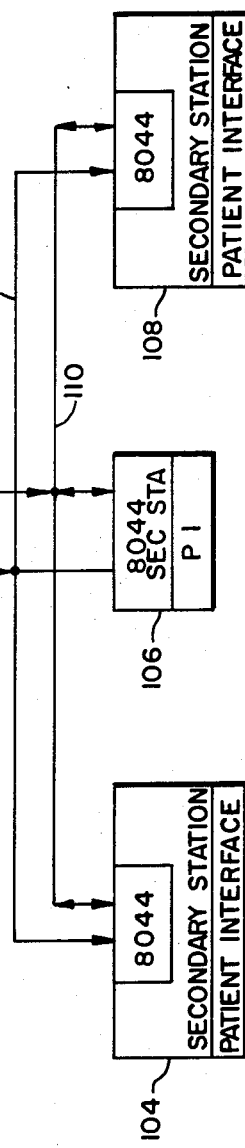
FIG. 2 is a block diagram of a frame of the Synchronous Data Link Control (SDLC) protocol used with the communication system of FIG. 1.

SDLC is a well known protocol designed by IBM (reference IBM publication GA27-3093-2, File No. GENL-09). It is a bit oriented, full duplex, serial by bit transmission, centralized control, synchronous, data communications message protocol. As shown in FIG. 2, the SDLC information frame comprises a flag byte 202 which is transmitted at the beginning and end of each message and represents a start of message and end of message delineator. The next byte after the start flag is the 8 bit address byte 204 which identifies the particular module or monitor to which a message is being transmitted by the primary station or from which a message is being received by the primary station. Following the address byte a control byte 206 is transmitted. The control byte provides the data link control mechanisms.

Three formats of the control byte are defined: information transfer; supervisory; and unnumbered.

All three of the formats include a P/F bit. When the primary station is transmitting the bit is called a poll bit (P) and when set to 1 means that the secondary must answer. If the secondary is transmitting the bit is a final bit (F) and indicates that the current block of the message is the final block when set to 1.

Fields within an information control byte are used to indicate the number of frames sent and the number of the next frame to be received when multiple frames are to be transferred before an acknowledgment is made. The supervisory control byte is used to provide status and control information for the supervision of the link while the unnumbered format is used for a multitude of link control purposes.

Following the control byte the message 208 is sent. This can be any number of bits in length but in the preferred embodiment it is an integer number of eight bits. Error checking is done by the 16 bits 210 which precede the end flag. Cyclic redundancy checking (CRC) is done on the contents of the address, control and information fields.

The SDLC protocol is transparent to the user since all the bits added to front and back of the message 208 at the transmit end are removed at the receive end. The secondary station 104, for example, presents its ECG analyzed data to the 8044 RUPI and it is received by the processor at the primary station in the same way that it was put in. The SDLC is almost always implemented by a separate hardware interface such as the previously mentioned Intel designed and manufactured 8044 RUPI. The 8044 performs all of the above described functions transparently to the primary and secondary station processors with software provided with the RUPI.

An important aspect of the present invention is the ability of the system 100 to initialize a node (i.e. add a new module or monitor) on the network without requiring that the SDLC address of the node be predetermined, and the ability to provide time synchronization to all of the nodes of the network. Both of these are made possible because of a broadcast mode of SDLC implemented within the 8044. Using an unnumbered control format the primary is able to transmit to all secondary units in the network simultaneously. The address byte used during broadcast is OFFH. The control field following the station address provides the data link control mechanisms. Unnumbered broadcasts are not acknowledged by the secondary stations.

Utilizing the above described broadcast feature, time of day (measured from midnight) is synchronized by means of a "time-tag broadcast" every 31.25 milliseconds. Each of these broadcasts to SDLC address OFFH is received by each secondary node regardless of its SDLC address. The information field 208 of each of these broadcasts contains a twenty-four bit time of day value indicating the time in 1/32 of a second since midnight. Real-time data returned from each of the secondary stations is accompanied by a copy of the time-tag value which designates the specific 1/32 of a second in which it was acquired.

Figure 3:
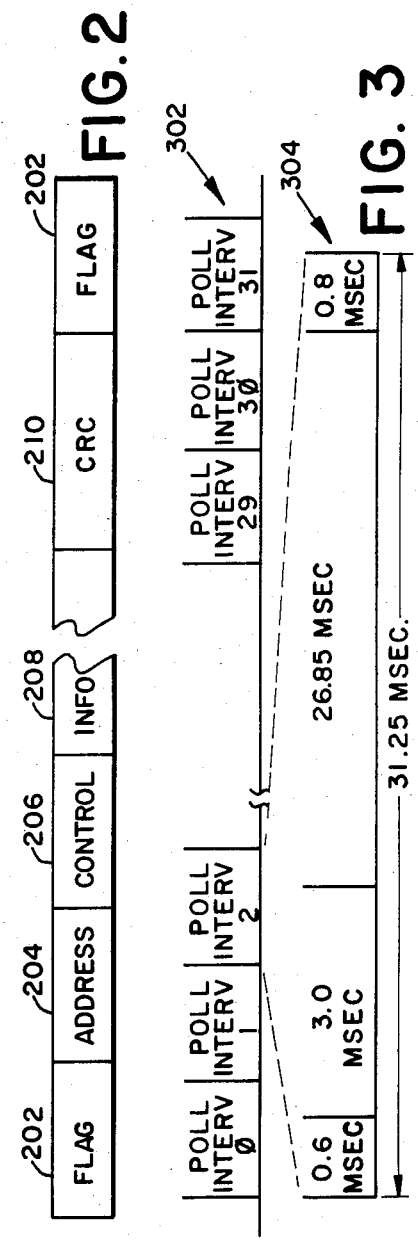
FIG. 3 is a block diagram showing the overall timing of the communication system of FIG. 1.

The overall timing of the network is shown in FIG. 3. Each second is broken into 32 poll intervals at 302. Each poll interval is shown in more detail at 304. A time-tag broadcast marks the beginning of each poll interval. It is initialized by an external interrupt to the primary's 8044 120. During the first 0.6 milliseconds (600 usec) the address initialization phase follows. This will be described in more detail hereinafter. Following the time-tag broadcast and any new station initialization response, the primary RUPI 120 generates an interrupt to the 80186 CPU 122 via line 124. This interrupt signals the 80186 to transfer data from memory 128 to the primary 8044. During the next 3.0 MSEC, data is transferred packet by packet, with one packet transmitted over the network while the next is transferred from the 80186 memory 128 to the primary 8044 120. Upon receipt of a "final packet" or the completion of the allowed transmit interval, the primary 8044 signals the 80186 with another interrupt to place the DMA channel 126 in the input mode to transfer data from 8044 120 to the 80186 main memory. The primary 8044 then transfers a data packet to the 80186 to indicate the number of data packets successfully transmitted and during the next 26.85 MSEC begins polling the secondary stations. The primary 8044 maintains a status table in its on-chip RAM which indicates which addresses are assigned, the status of each station, and the number of critical frames requested by each station. At the completion of the receive period or when all of the secondary stations have indicated that they have no more data to send, the primary 8044 transfers a "final packet" via the 80186 DMA channel to mark the end of valid data in the 80186 receive buffer.

Figure 4:
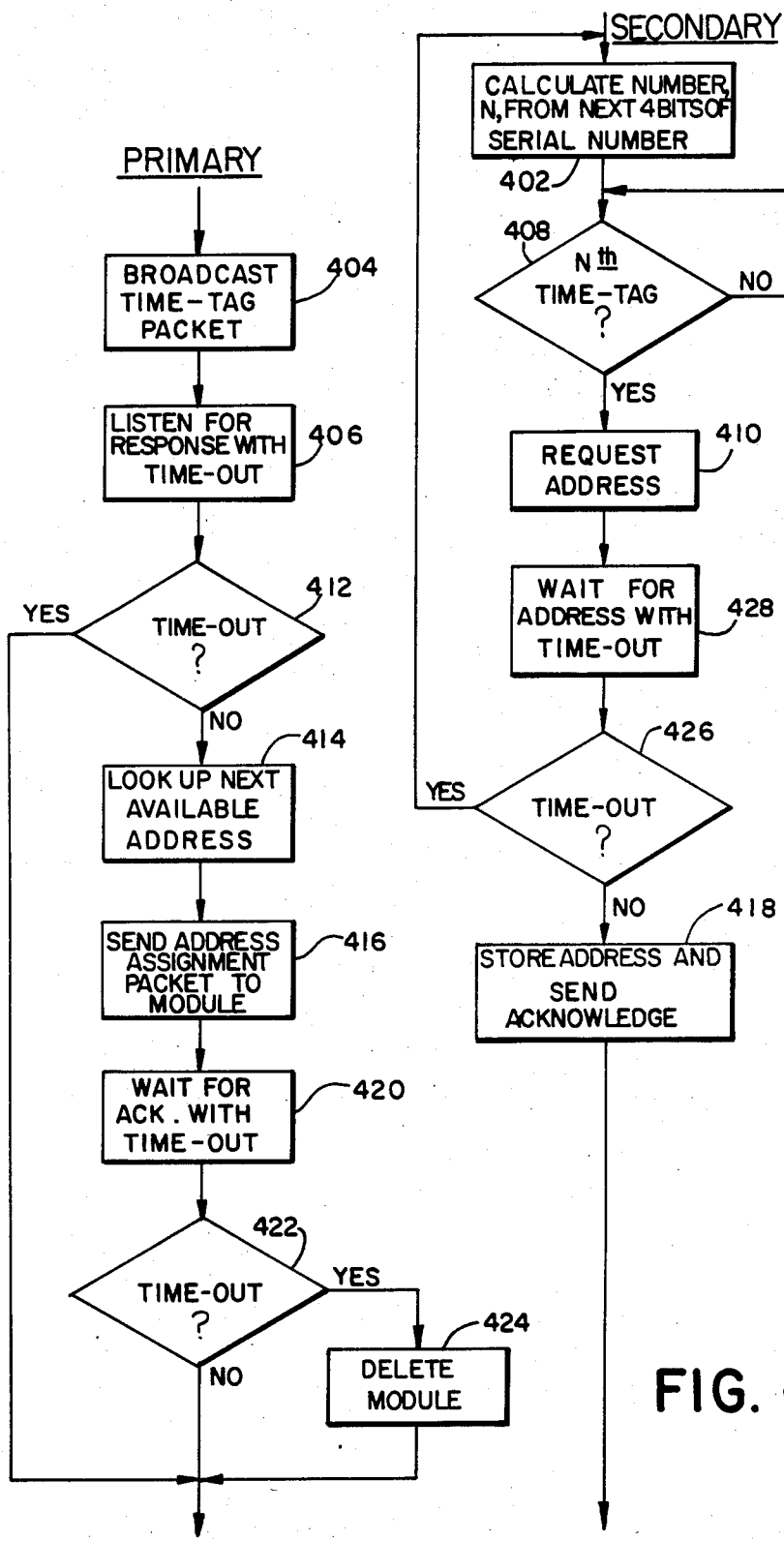
FIG. 4 is a block diagram of a program for address assignment of patient monitors/modules connected to the communication system of FIG. 1.

With reference to FIG. 4, a more detailed description of the address assignment program executed by the primary RUPI 122 is provided. The left most column of FIG. 4 indicates the program steps carried out by the primary RUPI 120 while the right hand column describes the program steps carried out by the secondary RUPIs of stations 104, 106 or 108, for example.

At power up, as a new module is plugged into a monitor or as a monitor is added to the network, the new module calculates a number, N, based on a unique 24 bit serial number assigned to it. See 402. Each module or secondary unit capable of operation on the network is assigned such a number. In the preferred embodiment the calculation is very simple, the new module simply selects the last four bits of its serial number and uses it as the number N. N therefore will range from 0-15. The primary will be continually broadcasting time-tags 404, 32 a second. After each time-tag broadcast, the primary will wait for a predetermined period within the first 0.6 milliseconds of each poll interval for a new node message from a new module requesting an address assignment 406. The new node message is also an unnumbered control field format and it includes the new module's unique serial number.

The new module meanwhile assumes an SDLC address OOH and waits N time-tags or N poll intervals 408 before responding within the predetermined period for a new node address request 410 using address OOH in its SDLC frame.

If the response is received in time by the primary 412, the primary RUPI looks up the next available address 414 and transmits it 416 to the secondary using the address OOH in the packet to the module. The response message from the primary echos the new module's unique serial number. This is compared with the new module's unique serial number at the new module to be sure that the address assignment is to the proper new module. The secondary stores the address 418 and uses it in all future communications. The secondary at the same time transmits an acknowledge to the primary.

The primary waits for the acknowledge 420 but if it is not received in time 422 the module is deleted 424.

If two new modules happen to request an address at the same time, a collision will occur at the primary and a CRC error will be generated. The predetermined period within the 0.6 millisecond interval will lapse, a time out 426 will occur and the colliding modules will generate new numbers, N, based on the next adjacent set of of four bits in their serial number 402. This process continues until the module obtains an address.

With this address assignment method the probability of collision diminishes as sixteen raised to the nth power, where n is the number of times the module has attempted to obtain an address. Therefore, the probability of collision on the first attempt is one in 16 raised to the first power, or one in sixteen. On the second attempt the probability is one in 16 raised to the second power, or one in 256, and so on. By the sixth attempt, the probability of collision is near one in 16 raised to the sixth power, or one chance in 16,777,216.

An alternate manner of calculating N is to use the unique module serial number as the seed of a random number generator. Upon initial application of power to the secondary node the first random number N of the sequence is computed modulo 32. Should a collision occur on the first attempt, the next iteration of the random number sequence is used to determine how many poll intervals to wait before again responding to a time-tag broadcast with a new node message.

What is claimed is:

1. A method of synchronizing to a multipoint communication system wherein a primary station repeatedly polls a plurality of secondary stations coupled together over a serial data bus comprising the steps of:
   dynamically assigning an address to a new secondary station upon coupling to said system, said step of dynamically assigning further comprising the steps of:
   broadcasting time-tags to all of said secondary stations simultaneously during an address initialization phase at the beginning of each poll interval;
   automatically determining a first time-tag count number of poll intervals for each of said new secondary stations upon coupling to said system;
   waiting said time-tag count number of poll intervals to choose a poll interval for requesting an address assignment from said primary station during said address initialization phase of said chosen poll interval;
   requesting said address assignment, and
   assigning an address to said secondary station in response to said request.

2. The method of claim 1 wherein said method further comprises the steps of:
   automatically determining second and subsequent time-tag count numbers as required when two or more secondary stations request address assignments during a chosen poll interval which is the same for the two or more secondary stations.

3. The method of claim 2 wherein said method further comprises the steps of:
   preassigning to each secondary station a unique multibit serial number;
   choosing a first predetermined subset of said multibit serial number as the basis of said first count number; and
   choosing a second predetermined subset of said multibit serial number as the basis for a second count number in the event of a simultaneous address request by two or more secondary stations, and so on until each new secondary station receives an address assignment.

4. The method of claim 3 wherein each of said predetermined subsets of said multibit serial number comprises said count number associated with each said predetermined subsets.

5. The method of claim 2 wherein said method further comprises the steps of:
   preassigning to each secondary station a unique multibit serial number; and
   using said serial number as the seed of a random number generator to generate a series of random numbers for use as the basis for said count numbers.

6. The method of claim 1 wherein each of said new secondary stations assumes a predetermined address until a unique address is assigned by said primary station.

* * * * *